W. A. RARIG.
COUPLING NIPPLE.
APPLICATION FILED JUNE 4, 1919.

1,369,301.

Patented Feb. 22, 1921.

Inventor
Walter A. Rarig.

By Harry C. Schroeder
Attorney

UNITED STATES PATENT OFFICE.

WALTER A. RARIG, OF OAKLAND, CALIFORNIA.

COUPLING-NIPPLE.

1,369,301. Specification of Letters Patent. Patented Feb. 22, 1921.

Application filed June 4, 1919. Serial No. 301,632.

*To all whom it may concern:*

Be it known that I, WALTER A. RARIG, a citizen of the United States, residing at Oakland, in the county of Alameda and State of California, have invented certain new and useful Improvements in Coupling-Nipples, of which the following is a specification.

My invention is a coupling nipple.

My invention is illustrated in the accompanying drawing which forms a part of this specification and the appended claim.

Referring to the drawing.

Figure 1:
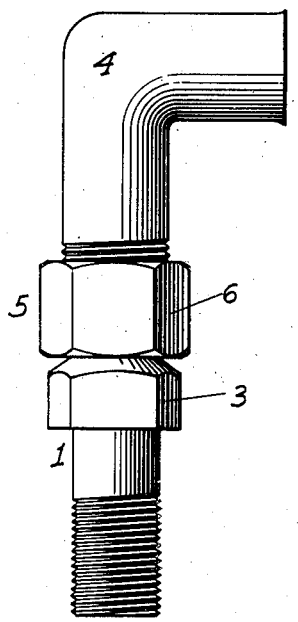
Figure 1 is a side elevation of my invention connected by a union to an elbow.
Figure 2:
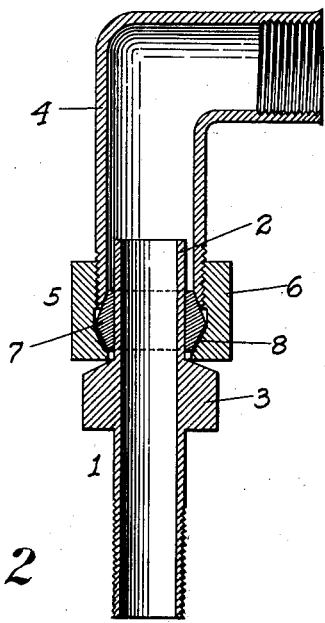
Fig. 2 is a vertical section of Fig. 1.
Figure 3:
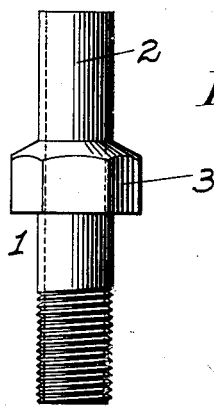
Fig. 3 is an elevation of my invention.

My nipple includes a tubular body 1 threaded at one end, and formed with a coupling shank 2 extending from its other end to a nut-like portion 3 formed intermediate its ends. The nipple may be screwed into an engine casing for example. In Figs. 1 and 2 my nipple is shown coupled to an elbow 4 by a union 5. The union comprises a nut 6 screwed on the lower end of said elbow and a double conical collar 7, interposed between a conical surface 8 in the nut and the lower end of said elbow, which collar slips over the coupling shank 2.

By screwing the nut 6 onto the elbow 4 the collar 7 is clamped between the nut surface 8 and the lower end of the elbow upon the shank 2, thus coupling the elbow to the nipple.

Having described my invention, I claim:

In combination, a coupling nipple including a tubular body threaded at one end, a coupling shank formed at the other end of said body, a nut portion on said body between its ends, a double conical collar fitting on said shank, and a nut threaded in one end to screw onto a tubular element and formed with a conical surface in its other end to engage one conical surface of said collar to draw said tubular element against the other conical surface of said collar.

In testimony whereof I affix my signature.

WALTER A. RARIG.